Nov. 21, 1961 S. FEIN 3,009,220
FLEXIBLE TIEING AND LOCKING DEVICE
Filed Feb. 24, 1958 2 Sheets-Sheet 1
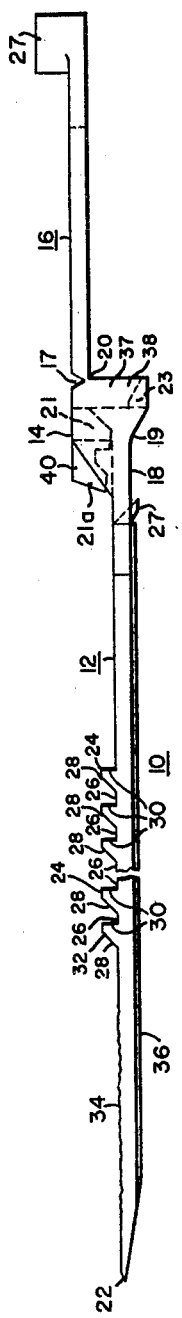
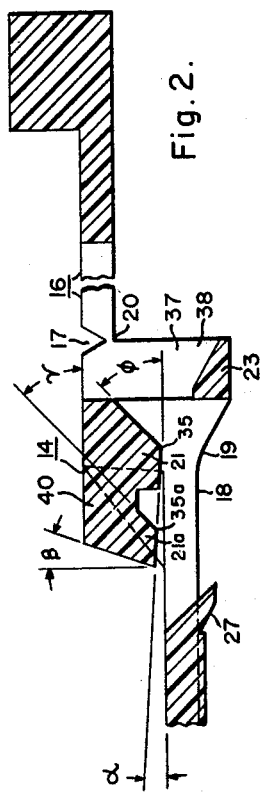
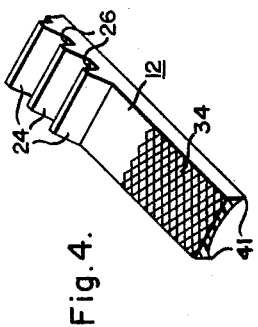
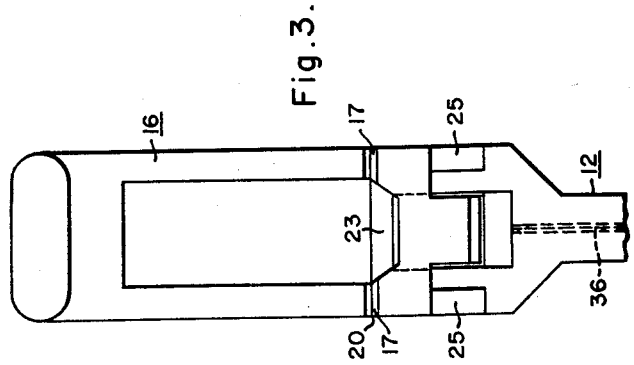
INVENTOR
Samuel Fein Nov. 21, 1961     S. FEIN     3,009,220
FLEXIBLE TIEING AND LOCKING DEVICE
Filed Feb. 24, 1958     2 Sheets-Sheet 2

United States Patent Office 3,009,220
Patented Nov. 21, 1961

---

3,009,220
FLEXIBLE TIEING AND LOCKING DEVICE
Samuel Fein, Irwin, Pa., assignor to Westinghouse Electric Corporation, East Pittsburgh, Pa., a corporation of Pennsylvania
Filed Feb. 24, 1958, Ser. No. 717,193
6 Claims. (Cl. 24—16)

This invention relates generally to a plastic tieing and locking device and more specifically to a device whose ends may be passed around a plurality of articles to bind such plurality of articles into substantially a unitary structure.

An object of this invention is to provide a flexible tieing and locking device comprised of a leader and a fastening means which can be easily and quickly applied around a plurality of articles to bind such articles into a substantially unitary structure.

Still another object of this invention is to provide a plastic universal cable clamp capable of supporting a cable in a suspended or hanging position.

Other objects of this invention will, in part, be obvious and will, in part, appear hereinafter.

More specifically and for a better understanding of the nature and objects of the invention, reference should be had to the following detailed description and drawings, in which:

FIGURE 1 is a side view of the locking device of this invention;

FIGURE 2 is an enlarged partial side view, in cross section, of the fastening means of the tieing and locking device of this invention;

FIGURE 3 is a fragmentary top view of the fastening means shown in FIG. 2.

FIGURE 4 is a fragmentary view in perspective of the leader component of the tieing and fastening means of this invention modified in accord with this invention.

Figure 5:
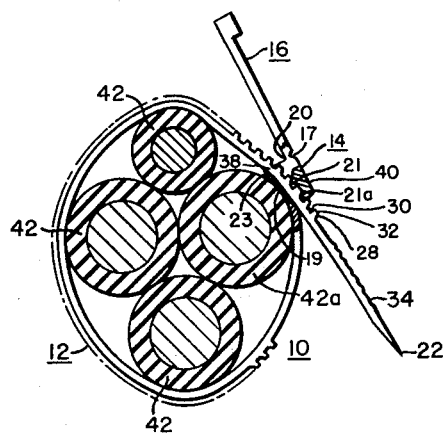
FIGURE 5 is a front view partially in cross section of a plurality of wires bound by the tieing and fastening means of this invention.

In accordance with the present invention and in attainment of the foregoing objects, there is provided a tough flexible plastic tieing and locking device adapted for encompassing about one or more members, said device comprising an elongated leader to be wrapped around the members, the leader having fastening means disposed at one end thereof and integral therewith, one surface of said leader being provided with a plurality of spaced protruding teeth, said fastening means being provided with a passageway adapted to receive the free end of said leader, at least one projection member adjacent the passageway adapted to engage with said teeth, whereby said device may be maintained in a locked position about encompassed members. For the purpose of preventing lateral movement of the member or members disposed in the tieing device, a V-shaped ridge is provided in the inside surface of the leader to bite into members.

Referring to the drawing, FIGURE 1 is a side view of the flexible tieing and locking device 10 of this invention comprising an elongated leader 12, a fastening means 14, and a pull tab 16. The leader 12 and the fastening means 14 are joined integrally at point 18. The fastening means 14 and the pull tab are joined integrally at point 20. The free end 22 of the leader 12 may be tapered from the bottom and both sides to form a substantially pointed tip. The top surface of leader 12 has disposed thereon a series of ratchet teeth 24 with substantial lands 26 between successive teeth. The teeth begin at a point a substantial distance from the free end 22 and extend to substantially the fastening means 14. Each of the teeth has a cam side 28 and a substantially vertical retaining side 30. The cam side 28 forms an angle of approximately 40 degrees with the surface of the leader and the retaining side 30 forms an angle of substantially 90 degrees with the surface of the leader. The angle between the cam side 28 and the surface of the leader may vary from 20 degrees to 60 degrees. However, the angle between the retaining side and the surface of the leader should be substantially a right angle to insure firm locking.

The substantial land between each of the individual teeth imparts considerable flexibility to the device. The land between successive teeth should be at least 0.010 inch. In any case, however, the length of the land should be in the range of 25% to 200% of the length of a tooth upon the surface of the leader. Excellent results have been obtained where each land is substantially equal to the length of a tooth upon the surface of the leader. In addition to flexibility, a substantial land between the successive teeth provides for greatly reduced notch cracking which will occur when the teeth abut one another without a land.

The upper surface of the leader between the tip 22 and the first tooth 32 may be embossed to provide a roughened surface such as one or more fine serrations or notches to insure a firm manual grip on the leader while pulling it through the fastening means 14.

The bottom surface of the leader 12 may be provided with a V-shaped ridge 36 tapering therefrom, and extending from substantially the tip of the leader 22 to the fastening means 14. The V-shaped ridge imbeds itself in each contacting article to be bound. Thereby the action of the V-ridge results in an elastic effect along the axis of the tie and fastening device. The V-ridge also improves the holding ability of the devices by preventing slippage along the axis of the bound article.

With reference to FIGURES 1, 2 and 3, the fastening means 14 is comprised of a passageway 38 defined by a guide bridge 23, side walls 37 and at least one flexibility pivotable ratchet buckle 40 having dogs 21 and 21a. A gusset 25 shown in FIGURE 3, is disposed at each side of the fastening means 14 to strengthen the fastening means to better withstand any stress resulting from flexing the leader 12.

As shown in FIGURE 5, in operation the leader 12 is passed around articles to be bound into a unitary structure, for example, a number of electrical conductors 42, and the substantially pointed tip 22 of the leader 12 is passed over the guide bridge 23 through the passageway 38 of the fastening means 14. As the leader 12 is drawn through passageway 38, the teeth 30 engage with and are firmly held by the ratchet dogs 21 and 21a binding the conductors 42 into a substantially unitary structure. The guide bridge 23 holds the leader in position so that the teeth 30 will pass under the ratchet dogs of buckle 40 in a plane substantially parallel to the plane of the dogs 21 and 21a and in contact therewith to insure positive interaction. While the device incorporates two ratchet dogs 21 and 21a, it should be understood that either dog alone is capable of engaging and locking the teeth of the leader into positions. While three or more dogs may be employed, two has proved to be an adequate number.

As the leader is pulled securely about the articles to be bound, a spur 27 disposed on the bottom of the leader and extending into the area of the fastening means 14 pivots in an upwardly direction and exerts pressure against the bottom of the leader as it passes under the ratchet dogs 21 and 21a, thereby increasing the locking force. As the circumference of the circle formed by the leader is further decreased, the articles being encompassed also exert pressure at area 19 on the leader as it passes under the ratchet buckle 40, thereby increasing the force holding the teeth of the leader in contact with the ratchet buckle dogs.

FIGURE 4 shows one modification of the present device which comprises forming the leader with a concave bottom surface in a transverse direction instead of the V-shaped ridge. When this last design is utilized, the two edges 41 of the leader act in much the same way as the V-shaped ridge, and the flattening out of the concave surface as the leader is pulled tight prevents lateral movement of the articles being bound, and exerts an elastic circumferential force.

Figure 6:
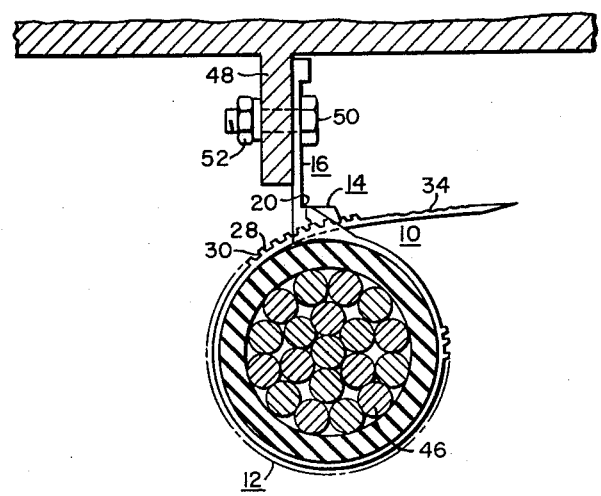
FIGURE 6 is a front view partially in cross section illustrating the device of this invention being utilized as a universal cable clamp.

The pull tab 16 shown in FIGURE 1, FIGURE 5, and FIGURE 6 facilitates manually holding and securing the locking and tieing device about the articles to be bound. After the device 10 has been secured about the articles to be bound, the pull tab 16 may be severed from the fastening device 14 at corner 20 by the exertion of additional tensile stress or by repeated flexing until it breaks off. To facilitate severance, a notch 17 may be located at corner 20 as shown in FIGURES 1 and 2.

FIGURE 6 illustrates the use of the device of this invention as a universal cable clamp. When it is desired to suspend an electrical cable 46 or the like from a flange 48, the device 10 of this invention is locked about the cable as described previously. The device 10 with cable 46 is secured to the flange 48 by passing a bolt 50 through an opening in the pull tab 16 and through a hole in flange 48, and securing said bolt 50 with a nut 52. It will be understood that the device of this invention may be secured to a support such as flange 48 by means other than bolting. It is, of course, obvious than when the device of this invention is to be used in this method it is undesirable to have the notch 17 at the corner 20.

The following example is illustrative of the practice of this invention and defines a preferred embodiment of this invention.

*Example I*

A tough flexible tieing and locking device as described and illustrated above was prepared by injection molding using nylon having a modulus of elasticity of 400,000 pounds per square inch at 73° F.

The over-all length of the device from the free tip 22 of the leader to the free end 27 of the pull tab was 5.0625 inches.

The leader, from free tip 22 to point 18, was 4.244 inches long. The tip 22 was tapered on both sides and the bottom from a point approximately 3⁄32 inch from the tip to the tip. The top surface of the leader was knurled from a point approximately 5⁄32 inch from tip 22 to a point approximately ¼ inch from the tip 22.

The top surface of the leader, beginning at a point approximately 1 inch from free tip 22 and extending to a point approximately 3¾ inches from free tip 22 has disposed thereon 44 equally spaced ratchet teeth. Each tooth has a cam side, shown as 28 in FIGURES 1, 4 and 5, which cam side forms a 40 degree angle with the surface of the leader, and a retaining side which forms a 90 degree angle with the surface of the leader. The distance between retaining sides of two successive teeth is 0.062 inch. Each tooth extends above the leader 0.025 inch. The leader exclusive of teeth is 0.023 inch high.

A V-shaped ridge is disposed along the bottom surface of the leader from a point 1.0 inch from tip 22 to a point approximately 3.964 inches from tip 22. The V-shaped ridge is 0.008 inch wide at the face of the ridge and leader. The vertex of said V-shaped ridge being 0.006 inch below the ridge-leader face.

A spur 27, shown in FIGURES 1 and 2, is disposed along the bottom of the leader from a point 4.12 inches from tip 22 to a point 4.214 inches from tip 22. The spur extends down from the bottom of the leader a distance of approximately 0.025 inch.

The over-all length of the fastening means 14 shown in FIGURES 1, 2 and 3 is 7⁄32 inch, and the over-all height is 5⁄32 inch.

The guide bridge 23, shown in FIGURES 1 and 2, is 3⁄64 inch long and 0.035 inch high.

The two ratchet dogs 21 and 21a, shown in FIGURES 1 and 2, extend 0.071 inch above the upper surface of the leader 12. With reference to FIGURE 2, angle alpha ($\alpha$) was 4 degrees, angle beta ($\beta$) was 20 degrees, angle gamma ($\gamma$) 45 degrees and angle phi ($\phi$) 45 degrees.

The pull tab 16, shown in FIGURE 1, was approximately ½ inch long and is integrally joined with the fastening means 14 at point 20. The notch 17, shown in FIGURE 17, is approximately 1⁄64 inch deep.

The fastening device described above was used to bind four electrical conductors 42 together, as shown in FIGURE 5. The leader 12 was passed around the conductors 42 and 42a and into the flared opening 38 of the fastening means 14. The leader passed over the guide bridge 23 and the teeth 24 of the leader 12 were engaged by the ratchet dogs 21 and 21a. The contact point between the teeth 24 and the dogs 21 and 21a is at point 35 and 35a. As the leader 12 was pulled tighter around the conductors 42, spur 27 exerted an upward pressure against the bottom surface of leader 12, thus increasing the locking force between teeth 24 and ratchet dogs 21 and 21a. As the leader is drawn still tighter, the conductor 42a exerts a pressure on the tieing and fastening means at point 19, thereby increasing the locking force between the ratchet dogs 21 and 21a and the teeth 24.

The V-shaped ridge 36 is imbedded into the insulation of the conductors 42 and 42a as the tieing and fastening device is drawn tightly about the conductors 42 and 42a.

After the conductors are tightly bound, the pull tab is flexed and stressed until it shears at point 17. The excess leader may then be cut off to give a neat appearance.

The above example is considered only illustrative and not a limitation of the present invention.

The device of this invention is molded from a tough plastic material selected from the group consisting of nylon, polyethylene, polyethylene terephthalate, polyvinyl resins such as poly(vinylchloride), poly(vinylacetate) and poly(vinylidenechloride), and polytetrafluoroethylene, and having a modulus of elasticity in the range of 35,000 to 2,000,000 pounds per square inch at 73° F. Moreover, it should be understood that depending on the end use, the device may be made of other suitably tough elastomers and plastic material. However, flexible materials similar in elastic elongation or stretchiness to ordinary rubber or which flow under moderate stresses are not suitable.

While the use of the device of this invention has been described primarily relative to applications in the electrical industry, where it is used to bind conductors together to form a unitary bundle or as a cable clamp, it should be understood that it may be used to hold and lock other types of members to a support member, for instance stem type shrub, flower and vegetable plants to supporting stakes and structures.

Since certain changes in the product embodying the invention may be made without departing from its scope, it is intended that the accompanying description and drawing to be interpreted as illustrative and not limiting.

I claim as my invention:

1. A tough flexible plastic tieing and locking device comprised of material selected from the group consisting of nylon, polyethylene, polyethylene terephthalate, polyvinyl resins and polytetrafluoroethylene and adapted for positioning about a member, said device comprising a leader having fastening means disposed at one end thereof and integral therewith and a pull tab attached to said fastening means and integral therewith, one surface of said leader being provided with a plurality of protruding ratchet teeth with a substantial lands between successive teeth, each of said lands being approximately as long as the root of a tooth as measured upon the surface of the leader, said teeth being disposed from substantially the fastening means to substantially the free end of the leader, each tooth having a cam side and a retaining side, the cam side forming approximately a 40° angle with the surface of the leader and the retaining side forming substantially a 90° angle with the surface of the leader, the opposite surface of said leader being provided with a V-shaped ridge projecting outwardly therefrom, in a direction opposite to the protruding teeth so as to engage the surface of the member about which it is secured to prevent slippage of the tieing and locking devices along the surface thereof, a spur disposed on the same surface of the leader as the V-shaped ridge at the approximate point at which the leader and fastening means are joined integrally, the end of the leader opposite from the fastening means being tapered and roughened, the fastening means being provided with a guide bridge, two side walls and a top wall attached to the upper end of the side walls and the guide being attached to the lower end of the side walls which guide bridge, side walls and top wall define a passageway through which the leader is adapted to pass, a pair of flexible dogs integral with the top wall and descending downwardly therefrom into the passageway, said dogs being adapted to engage the teeth of the leader whereby said leader when disposed about said member and passed through the passageway is maintained in a locking position about said member, and the spur functioning to press against the said opposite surface of the leader to force the ratchet teeth against the dogs.

2. A tough flexible plastic tieing and locking device comprised of material selected from the group consisting of nylon, polyethylene, polyethylene terephthalate, polyvinyl resins and polytetrafluoroethylene and adapted for positioning about a member, said device comprising a leader having fastening means disposed at one end thereof and integral therewith and a pull tab attached to said fastening means and integral therewith, one surface of said leader being provided with a plurality of protruding ratchet teeth with a substantial lands between successive teeth, each of said lands having a length in the range of 25% to 200% of the length of a tooth as measured at the surface of the leader, said teeth being disposed from substantially the fastening means to substantially the free end of the leader, each tooth having a cam side and a retaining side, the cam side forming approximately a 40° angle with the surface of the leader, and the retaining side forming substantially a 90° angle with the surface of the leader, the opposite surface of said leader being provided with a V-shaped ridge projecting outwardly therefrom, in a direction opposite to the protruding teeth so as to engage the surface of the member about which it is secured to prevent slippage of the tieing and locking device along the surface thereof, a spur disposed on the same surface of the leader as the V-shaped ratchet at the approximate point at which the leader and fastening means are joined integrally, the end of the leader opposite from the fastening means being tapered, the fastening means being provided with a guide bridge, two side walls and a top wall attached to the upper end of the side walls and the guide bridge being attached to the lower end of the side walls which guide bridge, side walls and top wall define a passageway through which the leader is adapted to pass, a pair of flexible dogs integral with the top wall and descending downwardly therefrom into the passageway, said dogs being adapted to engage the teeth of the leader whereby said leader when disposed about said member and passed through the passageway is maintained in a locking position about said member, and the spur functioning to press against the said opposite surface of the leader to force the ratchet teeth against the dogs.

3. A tough flexible plastic tieing and locking device comprised of material selected from the group consisting of nylon, polyethylene, polyethylene terephthalate, polyvinyl resins, and polytetrafluoroethylene and adapted for positioning about a member, said device comprising a leader having fastening means disposed at one end thereof and integral therewith and a pull tab attached to said fastening means and integral therewith, one surface of said leader being provided with a plurality of protruding ratchet teeth with a substantial lands between successive teeth, each of said lands having a length in the range of 25% to 200% of the length of a tooth as measured at the surface of the leader, said teeth being disposed from substantially the fastening means to substantially the free end of the leader, each tooth having a cam side and a retaining side, the cam side forming an angle in the range of 20° to 60° with the surface of the leader, and the retaining side forming substantially a 90° angle with the surface of the leader, the opposite surface of said leader being provided with a V-shaped ridge projecting outwardly therefrom, in a direction opposite to the protruding teeth so as to engage the surface of the member about which it is secured to prevent slippage of the tieing and locking device along the surface thereof, a spur disposed on the same surface of the leader as the V-shaped ridge at the approximate point at which the leader and fastening means are joined integrally, the end of the leader opposite from the fastening means being tapered, the fastening means being provided with a guide bridge, two side walls and a top wall attached to the upper end of the side walls and the guide being attached to the lower end of the side wall which guide bridge, side walls and top wall define a passageway through which the leader is adapted to pass, a pair of flexible dogs integral with the top wall and descending downwardly therefrom into the passageway, said dogs being adapted to engage the teeth of the leader whereby said leader when disposed about said member and passed through the passageway is maintained in a locking position about said member, and the spur functioning to press against the said opposite surface of the leader to force the ratchet teeth against the dogs.

4. A tough flexible plastic tieing and locking device comprised of material selected from the group consisting of nylon, polyethylene, polyethylene terephthalate, polyvinyl resins and polytetrafluoroethylene and adapted for positioning about a member, said device comprising a leader having fastening means disposed at one end thereof and integral therewith and a pull tab attached to said fastening means and integral therewith, one surface of said leader being provided with a plurality of protruding ratchet teeth with a substantial lands between successive teeth, each of said lands having a length in the range of 25% to 100% of the length of a tooth as measured at the surface of the leader, said teeth being disposed from substantially the fastening means to substantially the free end of the leader, each tooth having a cam side and a retaining side, the cam side forming an angle in the range of 20° to 60° with the surface of the leader, and the retaining side forming substantially a 90° angle with the surface of the leader, the opposite surface of said leader being provided with a V-shaped ridge projecting outwardly therefrom, in a direction opposite to the protruding teeth so as to engage the surface of the member about which it is secured to prevent slippage of the tieing and locking device along the surface thereof, a spur disposed on the same surface of the leader as the V-shaped ridge at the approximate point at which the leader and fastening means are joined integrally, the end of the leader opposite from the fastening means being tapered, the fastening means being provided with a guide bridge, two side walls and a top wall attached to the upper end of the side walls and the guide being attached to the lower end of the side walls, which guide bridge, side walls and top wall define a passageway through which the leader is adapted to pass, at least one flexible dog integral with the top wall and descending downwardly therefrom into the passageway, said dog being adapted to engage the teeth of the leader whereby said leader when disposed about said member and passed through the passageway is maintained in a locking position about said member, and the spur functioning to press against the said opposite surface of the leader to force the ratchet teeth against the dogs.

5. A tough flexible plastic tieing and locking device comprised of material selected from the group consisting of nylon, polyethylene, polyethylene terephthalate, polyvinyl resins and polytetrafluoroethylene and adapted for positioning about a member, said device comprising a flat leader having fastening means disposed at one end thereof and integral therewith and a pull tab attached to said fastening means and integral therewith, only one flat surface of said leader being provided with a plurality of protruding ratchet teeth with a substantial lands between successive teeth, each of said lands being as long as the root of a tooth as measured upon the surface of the leader, each tooth having a cam side and a retaining side, the cam side forming approximately a 40° angle with the surface of the leader and the retaining side forming substantially a 90° angle with the surface of the leader, said teeth being disposed from substantially the fastening means to substantially the free end of the leader the opposite surface of said leader being concave, a spur disposed on the concave surface of the leader at the approximate point at which the leader and fastening means are joined integrally, the end of the leader opposite from the fastening means being tapered, the fastening means being provided with a guide bridge, two side walls and a top wall which define a passageway through which the leader is adapted to pass, a pair of flexible dogs integral with the top wall and descending downwardly therefrom into the passageway, said dogs being adapted to engage the teeth of the leader whereby said leader when disposed about said member and passed through the passageway is maintained in a locking position about said member, and the spur functioning to press against the said opposite surface of the leader to force the ratchet teeth against the dogs.

6. A tough flexible plastic tieing and locking device comprised of a tough plastic material having a modulus of elasticity in the range of 35,000 to 2,000,000 pounds per square inch at 73° F., and adapted for positioning about members, said device comprising a flat leader having fastening means disposed at one end thereof and integral therewith, said flat leader having two oppositely opposed flat surfaces, only one flat surface of said leader being provided with a plurality of protruding ratchet teeth with substantial lands between each of said teeth, each of said lands having a length in the range of from 25% to 100% of the length of a tooth as measured at the surface of the leader, said teeth being disposed along the surface of the leader from a point a substantial distance from the free end to substantially the fastening means and extending substantially across the leader, each tooth having a cam side and a retaining side, the cam side forming an angle in the range of 20 to 60 degrees with the flat surface of the leader and the retaining side forming approximately a 90 degree angle with the flat surface of the leader, the other flat surface of said leader being provided with a V-shaped ridge projecting outwardly therefrom in a direction opposite to the protruding teeth and extending from substantially the free end of the leader to the fastening means, the fastening means being provided with a passageway adapted to receive the leader, said fastening means comprising at least one projection extending into the passageway and adapted to engage with the teeth, whereby said device may be maintained in a locking position about said members.

References Cited in the file of this patent

UNITED STATES PATENTS

| | | |
|---|---|---|
| 1,804,725 | Walker | May 21, 1931 |
| 2,632,217 | Flora | Mar. 21, 1953 |
| 2,884,214 | Wrobel | Apr. 28, 1959 |
| 2,915,268 | Wrobel | Dec. 1, 1959 |
| 2,936,980 | Rapata | May 17, 1960 |

FOREIGN PATENTS

| | | |
|---|---|---|
| 508,037 | Italy | Jan. 4, 1955 |
| 1,086,754 | France | Aug. 18, 1954 |
| 1,126,581 | France | July 30, 1956 |